United States Patent [19]

Terashima

[11] Patent Number: 5,766,018
[45] Date of Patent: Jun. 16, 1998

[54] DISC PLAYBACK SYSTEM, KARAOKE SYSTEM AND DISC PLAYBACK METHOD

[75] Inventor: Junichi Terashima, Tokyo, Japan

[73] Assignee: Sega Enterprises, Ltd., Tokyo, Japan

[21] Appl. No.: 558,960

[22] Filed: Nov. 13, 1995

[30] Foreign Application Priority Data

Nov. 14, 1994 [JP] Japan ................... 6-279588
Sep. 20, 1995 [JP] Japan ................... 7-241992

[51] Int. Cl.$^6$ ................... G09B 5/08; G10H 1/36
[52] U.S. Cl. ................... 434/307 A; 434/318; 434/307 R; 84/609; 84/610; 386/55; 369/32
[58] Field of Search ................... 434/307 R–309, 434/318, 365; 84/477 R, 601, 603, 609, 610, 625, 630, 631, 634, 645; 369/22, 32, 34, 48, 50, 83, 178, 192; 360/1.9, 33.1, 32, 49, 69, 70, 72.1, 77.01, 98.04; 348/488, 552, 571, 678; 386/55; 345/141, 143, 147; 381/81

[56] References Cited

U.S. PATENT DOCUMENTS

| 4,717,971 | 1/1988 | Sawyer | 386/55 |
| 4,796,099 | 1/1989 | Compton | 386/55 |
| 5,247,126 | 9/1993 | Okamura et al. | 434/307 A |
| 5,364,270 | 11/1994 | Aoyama et al. | 434/318 X |
| 5,397,853 | 3/1995 | Koguchi | 434/307 A |
| 5,466,883 | 11/1995 | Miyashita et al. | 434/307 A |
| 5,609,486 | 3/1997 | Miyashita et al. | 434/307 A |

FOREIGN PATENT DOCUMENTS

| 56189 | 1/1993 | Japan |
| 9301596 | 1/1993 | WIPO |

*Primary Examiner*—Joe Cheng
*Attorney, Agent, or Firm*—Price, Gess & Ubell

[57] ABSTRACT

It is an object of this invention to provide a low-cost disc playback system which reduces the time the user has to wait for a disc to be played back. To achieve this objective, the system mounts a disc, added to the rack 1, onto the player 2, reads the beginning part data of the disc, and stores it in the fixed disk unit 5. The user gives a disc playback instruction from the instructing means 6. Then, the system reads the beginning part data of the requested disc from the fixed disk unit 5, and sends it immediately to the outputting means 3. While the beginning part data is being played back, the system mounts the requested disc onto the player 2 and starts reading data from it. The system switches the beginning part data, sent from the fixed disk unit 5 to the outputting means, to the part of data on the disc corresponding to the beginning part data when they are synchronized.

7 Claims, 8 Drawing Sheets

DISC PLAYBACK SYSTEM, KARAOKE SYSTEM AND DISC PLAYBACK METHOD

FIELD OF THE INVENTION

This invention relates to an improved disc playback system which mounts a disc, such as an moving-image disc stored in a rack, and plays it back.

DESCRIPTION OF THE PRIOR ART

A disc playback system has been used which plays back video or sounds recorded on a disc, such as a laser disc or compact disc. Recently, a system with a rack containing many discs is now popular; this system will automatically mount a user-requested disc from the rack onto the player for playback. This type of disc playback system is widely used, for example, in a karaoke system which uses many accompaniments with video.

A conventional simply-structured disc playback system has one or two players on which selected discs are mounted, one after another, for playback. This type of system stores discs in a cylinder-type rack (FIG. 4), table-type rack (FIG. 5), or doughnut-type rack (FIG. 6) and, when a disc is requested, moves an arm to transport the requested disc to or from the player (FIG. 4) or moves the discs or the player to get the requested disc (FIGS. 5 and 6).

This type of system is usually slow because it must enter a wait state from the time the user requests a disc to the time the disc is played back. Especially, on entertainment systems such as a karaoke system, this delay keeps the users waiting and can interrupt the festivities of the event.

In fact, a conventional karaoke system takes from 7 seconds to about 60 seconds until it starts playing back, the average being about 30 seconds.

To significantly reduce the time from the moment the user issues a request to the moment the system starts playing back, it is necessary to install as many players as discs and to have a disc mounted on each player in order to start playing back as soon as the system receives a request (FIG. 7). However, in this construction, two requirements—an increase in the number of discs and a reduction in cost—contradict with each other because the system cost increases as the number of discs increases.

This invention seeks to solve the problems associated with the prior art described above. It is an object of this invention is to provide a low-cost disc playback system which instantly starts playing back as soon as it receives a request. It is another object of this invention to provide a disc playback system whose operation is smooth. It is still another object of this invention to provide a disc playback system which allows the user to audition the beginning part of a disc.

SUMMARY OF THE INVENTION

In order to accomplish the above objects, a disc playback system includes a rack for storing a plurality of discs containing data; a player for reading data from the disc; outputting device for outputting the data that has been read; a changer for mounting the disc from the rack onto the player and for returning the disc from the player to the rack; a storage unit for storing data; a storing device for mounting the disc, added to the rack, onto the player and for reading the beginning part of the data from the disc and storing it in the storage unit; an instructing device for giving an instruction to play back the disc in the rack; a first reading device for reading the beginning part of data of the requested disc from the storage unit and immediately sending it to the outputting; a second reading for mounting the requested disc onto the player, while the beginning part of the data is being played back, and for starting a reading of the data from the disc; and a switching device for switching the beginning part of data from the storage unit, which has been sent to the outputting device, to the data from the disc corresponding to the beginning part of data when synchronization is established; wherein, the data on the disc contains a sequence of contents data containing at least one of video data or sound data and wherein the storing means stores the beginning part of the sequence of contents data as the beginning part of data.

The invention can be implemented in a karaoke system comprising: a rack for storing a plurality of discs containing data; a player for reading data from the disc; an outputting device for outputting the data that has been read; a changer for mounting the disc from the rack onto the player and for returning the disc from the player to the rack; a storage unit for storing data; a storing device for mounting the disc, added to the rack, onto the player and for reading the beginning part of data from the disc and storing it in the storage unit; an instructing device for giving an instruction to play back the disc in the rack; a first reading device for reading the beginning part of the data of the requested disc from the storage unit and immediately sending it to the outputting device; a second reading device for mounting the requested disc onto the player, while the beginning part of the data is being played back, and for starting the reading of data from the disc; a switching device for switching the beginning part of the data from the storage unit, which has been sent to the outputting device, to the data from the disc corresponding to the beginning part of data when synchronization is established; a sound input microphone; and a sound mixing circuit; wherein, the data on the disc contains a sequence of contents of data containing at least one of video data or sound data and wherein the storing device stores the beginning part of the sequence of contents of the data as the beginning part data.

A disc playback method can realize the invention from a methodological standpoint and includes a disc playback method using: a rack for storing a plurality of discs containing data; a player for reading data from the disc; an outputting device for outputting the data that has been read; a changer for mounting the disc from the rack onto the player and for returning the disc from the player to the rack; and a storage unit for storing data. The method comprises a storing process for mounting the disc, added to the rack, onto the player and for reading the beginning part of data from the disc and storing it in the storage unit; an instructing process for giving an instruction to play back the disc in the rack; a first reading process for reading the beginning part data of the requested disc from the storage unit and immediately sending it to the outputting device; a second reading process for mounting the requested disc onto the player, while the beginning part data is being played back, and for starting a reading of the data from the disc; and a switching process for switching the beginning part of data from the storage unit, which has been sent to the outputting device, to the data from the disc corresponding to the beginning part of data when synchronization is established; wherein, the data on the disc contains a sequence of contents data containing at least one of video data or sound data and wherein the storing device stores the beginning part of the sequence of contents data as the beginning part data.

According to the invention which has the construction described above, the system mounts a disc on the player as soon as it is added to the rack, reads data from the beginning part, and stores the data in a storage unit. The system does this for all the discs added to the rack and, as a result, the fixed disk (storage unit) contains data from the beginning parts of all the discs.

When the user makes a playback request for a disc in the rack, the system reads the beginning part data of the requested disc from the storage unit and outputs it immediately. The system not only retrieves the beginning part data from the storage unit and plays it back, but also it selects the requested disc from the rack, mounts it on the player, and starts reading data from it.

The system then tries to synchronize the beginning part data from the storage unit with the beginning part data from the disc and, when they are synchronized, switches the output from the storage unit to the output from the selected disc.

According to the invention the beginning part data, which has been read from a disc and stored on the storage unit, is used until the system starts playing back data from a disc. Because the system can read data from the storage unit immediately after it receives a request, the user need not wait for data to be read from the disc. In addition, the system requires only as many players as are required for playing back a plurality of discs concurrently. Therefore, this invention makes it possible to provide a low-cost disc playback system which reduces the time the user has to wait for a disc to be played back.

Especially, the invention is ideal for a karaoke system with the video feature such as a BGV, plays back video and sounds immediately after the user makes a playback request for a selected song, thus solving the problem of leaving the user cold because of a long wait time.

The invention is a disc playback system further comprising a buffer memory in which data read from the disc is stored.

According to the invention the system reads data from a disc and stores it in the buffer. This prevents such errors as an out-of-track condition caused by vibrations and, in addition, synchronizes the ending point of the beginning part data with the playback start point of data on the disc, ensuring a smooth playback.

The invention is a disc playback system wherein a fixed disk unit containing a fixed disk is used as the storage unit, the fixed disk unit having a plurality of sets of heads, each set of heads being capable of playing back data from a different track of the fixed disk concurrently.

According to the invention a fixed disk unit that is used as the storage unit has a plurality of sets of heads to enable each head set to play back data from a different cylinder (track) of the fixed disk. Therefore, even when a plurality of disc playback requests are given at the same time, the system smoothly reads the beginning data concurrently from a plurality of cylinders of the fixed disk without causing a read speed bottleneck.

The invention is a disc playback system further beginning part playback device for playing back only the beginning part of data upon request.

According to the invention a request from the user causes only the starting part of data of a requested song to be played back for audition with no load on the changer and player.

Other and further objects, features and advantages of the invention will appear more fully from the following description.

The numbers used in each figure refer to the following.

1: Rack
2: Player
3: Outputting means
4: Changer
5: Fixed disk unit
6: Instructing means
7: CPU
8: Bus
9: Buffer memory

DESCRIPTION OF THE PREFERRED EMBODIMENTS

Referring to the attached drawings, there is shown a preferred embodiment (hereafter called embodiment) of this invention.

(1) Construction of the embodiment

It is an object of this embodiment is to provide a low-cost disc playback system which reduces the time the user has to wait for data to be played back from a disc. It is another object of this embodiment to provide a disc playback system whose operation is smooth. It is still another object of this embodiment to provide a disc playback system which allows the user to audition the beginning part of a disc.

Figure 1:
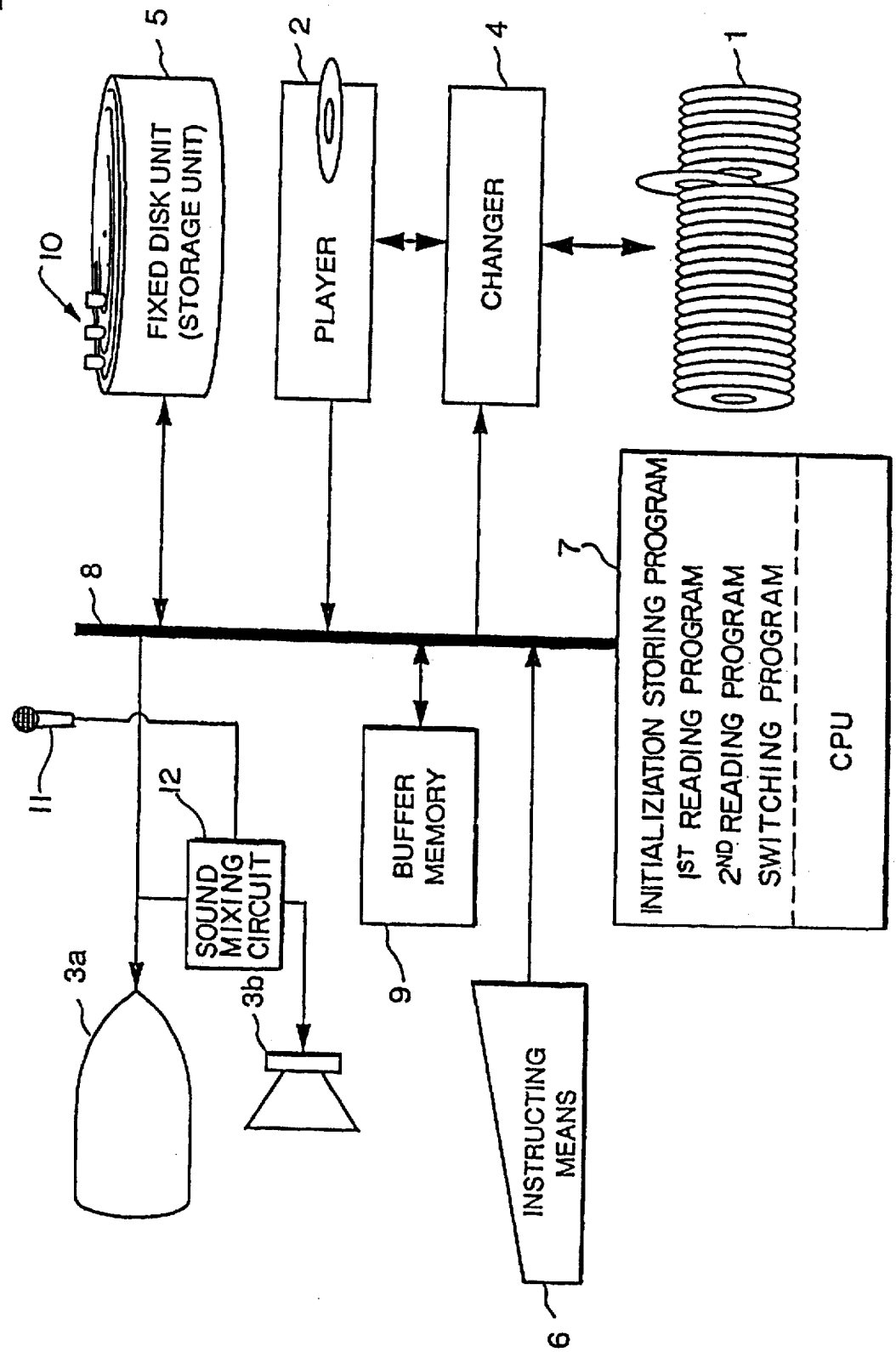
FIG. 1 is a functional block diagram showing the structure of the disc playback system used in the embodiment of this invention.

FIG. 1 is a functional block diagram showing the construction of the disc playback system in this embodiment. As shown in this figure, the disc playback system in this embodiment has a rack 1 which contains a plurality of discs on which data is recorded, a player 2 which reads data from a disc, an outputting means 3 (CRT 3a and speaker 3b) to which data that has been read is output, and a changer 4 which mounts a disc from the rack onto the player or returns a disc mounted on the player back to the rack. In addition, this disc playback system has a fixed disk unit 5 on which data is recorded and an instructing means 6 from which a request to play back a disc in the rack is entered.

In addition, the disc playback system in this embodiment has a CPU 7 which is controlled by a program, a bus 8 which connects the CPU to the hardware, and a I/O control circuit which is not shown in the figure. The CPU 7 comprises the initialization storing means in that it controls the hardware such that the hardware mounts a disc which is added to the rack 1 onto the player 2 and stores the beginning part of data of the disc into the storage unit 5. In addition, the CPU 7 comprises a first reading means in that it controls the hardware such that the hardware reads the beginning part of data of a disc from the storage unit 5 and sends it to the outputting means 3.

The CPU 7 also comprises a second reading means in that it controls the hardware such that the hardware mounts the selected disc onto the player 2 and starts reading data from the disc while the beginning part data is being played back from the storage unit 5. In addition, the CPU 7 comprises the switching means in that it control the hardware such that the hardware synchronizes the beginning part of data, sent from the fixed disk unit 5 to the outputting means 3, to the beginning part of data from the disc.

The disc playback system in this embodiment also has a buffer memory 9 into which data read from the disc is stored temporarily.

(2) Operation and effect of this embodiment

This embodiment with the construction described above performs the following operation.

Figure 2:
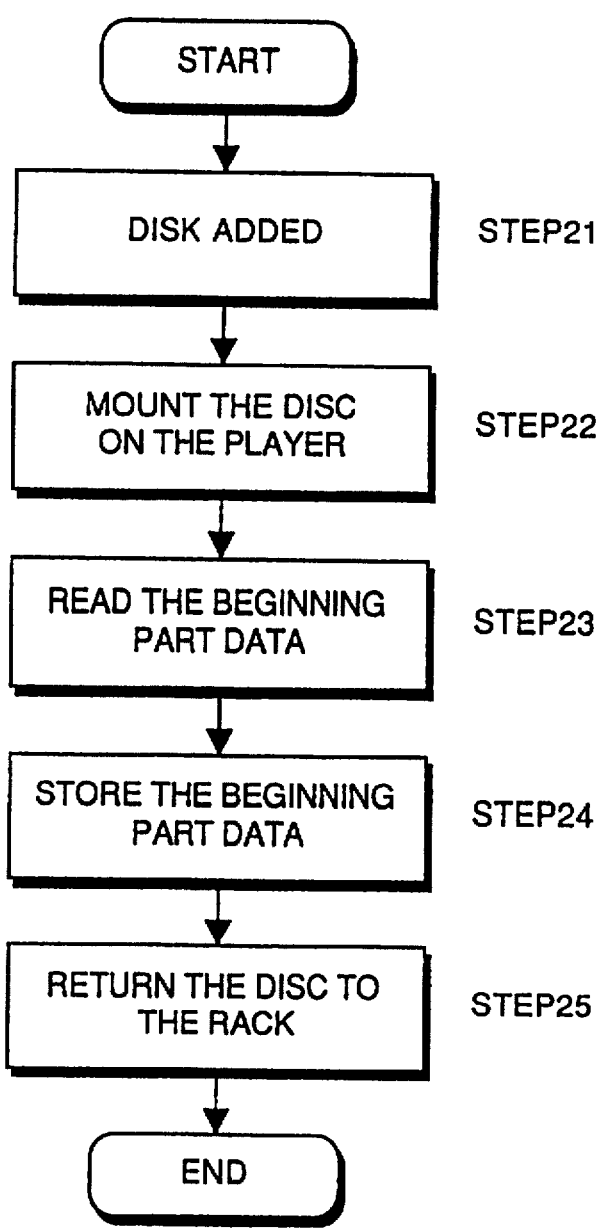
FIG. 2 is a flowchart showing the initialize mode operation of the disc playback system used in the embodiment of this invention.

The disc playback system in this embodiment operates in one of two modes: an initialize mode in which a beginning part of data is stored and the operation mode in which data is played back from a disc. FIG. 2 is a flowchart showing the operation in the initialize mode. For example, when a new disc is added to the disc rack (step 21), the disc playback system enters the initialize mode. That is, the disc is mounted on the player 2 (step 22), and the beginning part of data of the disc is read (step 23) and then stored in the specified location in the storage unit 5 (step 24). Then, the disc is returned to the rack 1 by the changer 4 (step 25).

Normally, a disc contains digital video or sound data, such as moving-image data in the MPEG format. In this format, 1/15 second of moving-image data corresponds to 2048 bytes (2 KB) of digital data. So, one second of moving-image data requires 150 KB, and 10 seconds of moving-image data requires 1.5 MB. The amount of beginning part data required for one song depends on how long it takes for the changer to move a disc from the rack to the player. In most case, about 30 seconds of moving-image data (4.5 MB) would be sufficient for the length of the wait time that is required before data is played back from the disc.

When a fixed disk unit with the capacity of 500 MB is used as the storage unit for storing the beginning part of data, it can contain the beginning part data of about 100 discs, including control information used to access the fixed disk.

A disc may contain not only contents data such as MPEG digital data but also control information for assessing the disc such as song numbers or storage area physical addresses. Note that, in the description of this invention, beginning part data means, not control information for accessing the disc, but video and sound data; that is, it is contents data itself not including control information. However, disc ID numbers and song numbers may be used as index data for associating the beginning part of data with discs, if necessary.

The format of a disc used in this invention is not limited to existing formats. In the simplest case, one disc contains moving-image data and sounds of one song. This format does not require control information. Because all the data area on the disc, from the beginning to the end, is available for recording data, it may be used just like a sequential file on a magnetic tape. In this case, 4.5 MB of compressed digital data is read from the beginning of the disc for transfer to the storage unit such as a RAM disk or hard disk.

Even when one disc contains a plurality of songs, the beginning part of data is the same as when one disc contains one song except that control information is used for reading data from the disc. Index data for accessing a beginning part of data must contain at least the ID of a disc and the sequence number of a song on that disc.

When a plurality of discs are added to the rack, as many beginning part of data items as added discs are copied, one at a time, to the fixed disk unit 5.

In this manner, the beginning part of data of all the discs added to the rack is accumulated in the fixed disk.

Figure 3:
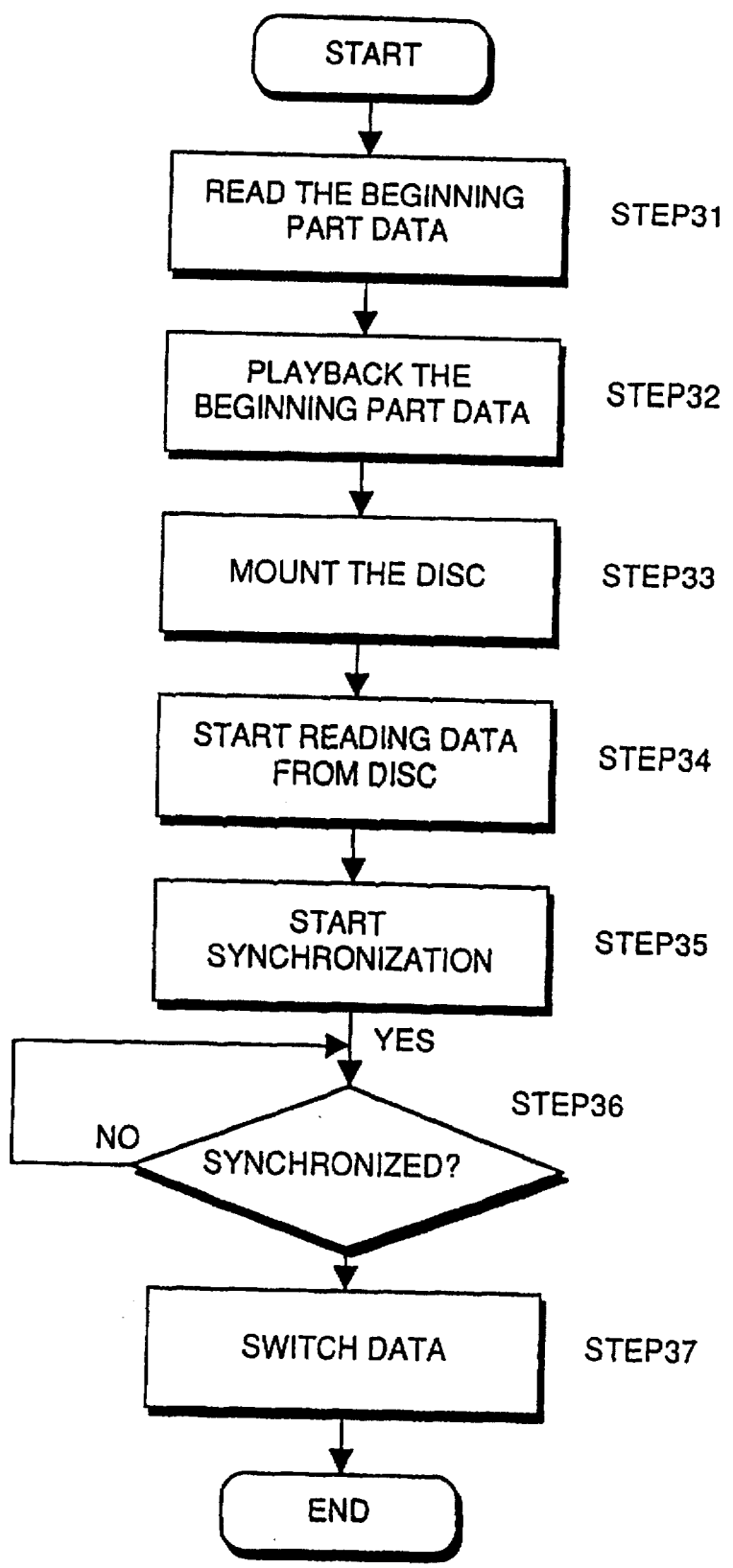
FIG. 3 is a flowchart showing the operation mode operation of the disc playback system used in the embodiment of this invention.
Figure 4:
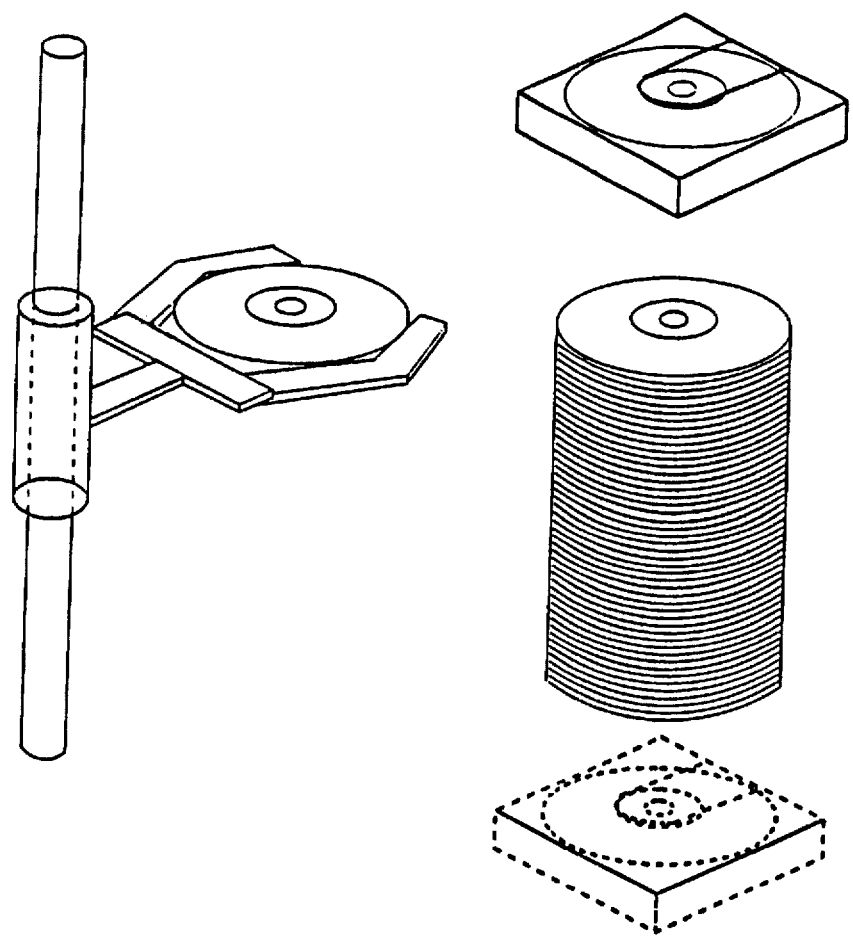
FIG. 4 is a diagram showing the structure of a conventional disc playback system.
Figure 5:
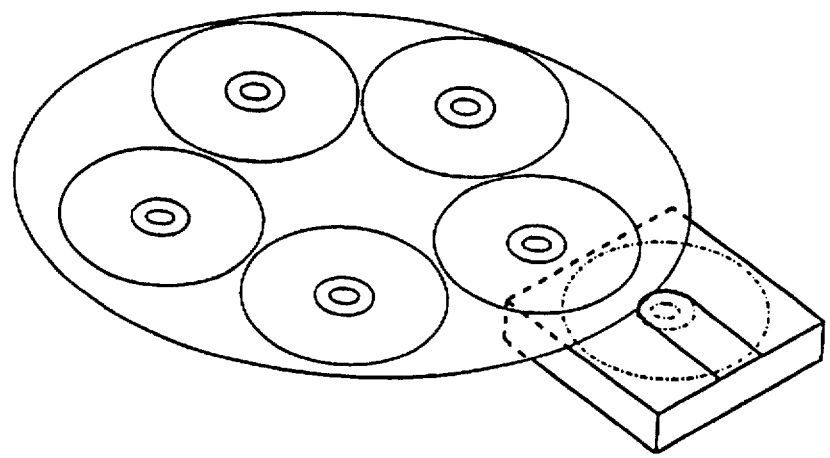
FIG. 5 is a diagram showing the structure of a conventional disc playback system.
Figure 6:
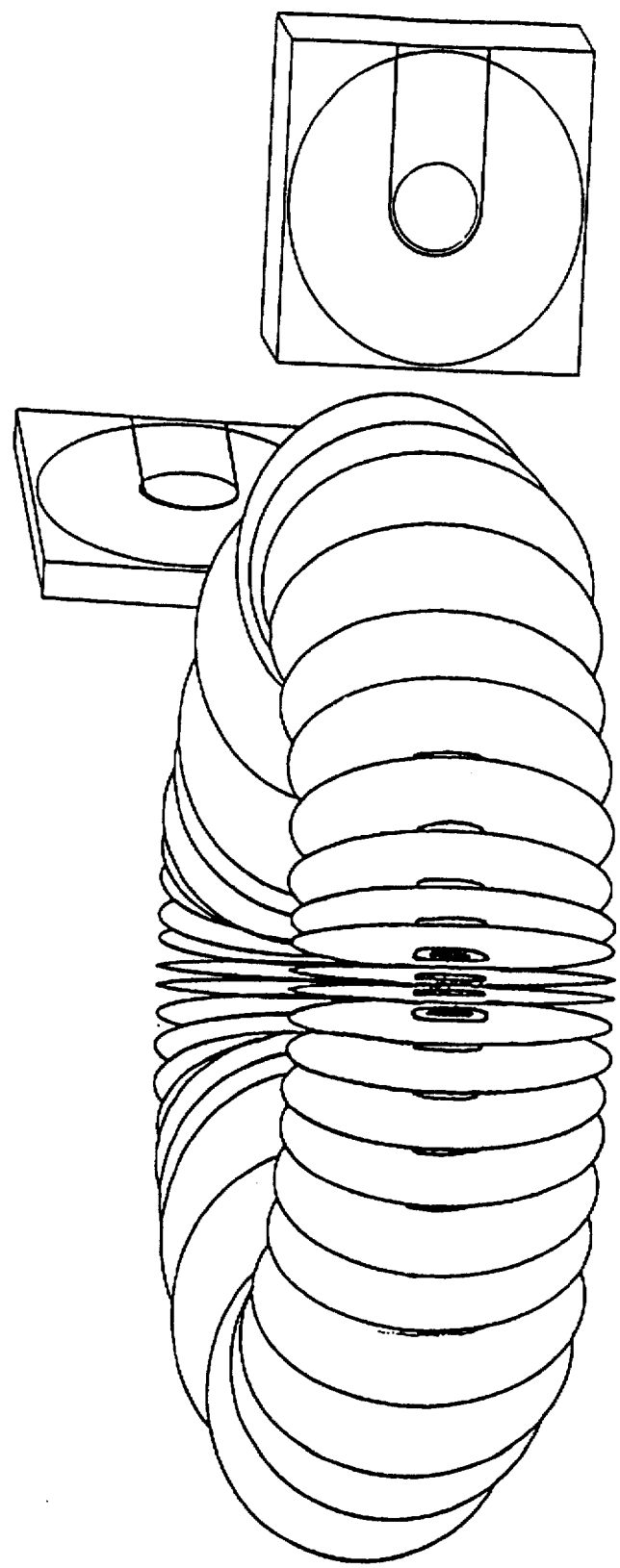
FIG. 6 is a diagram showing the structure of a conventional disc playback system.
Figure 7:
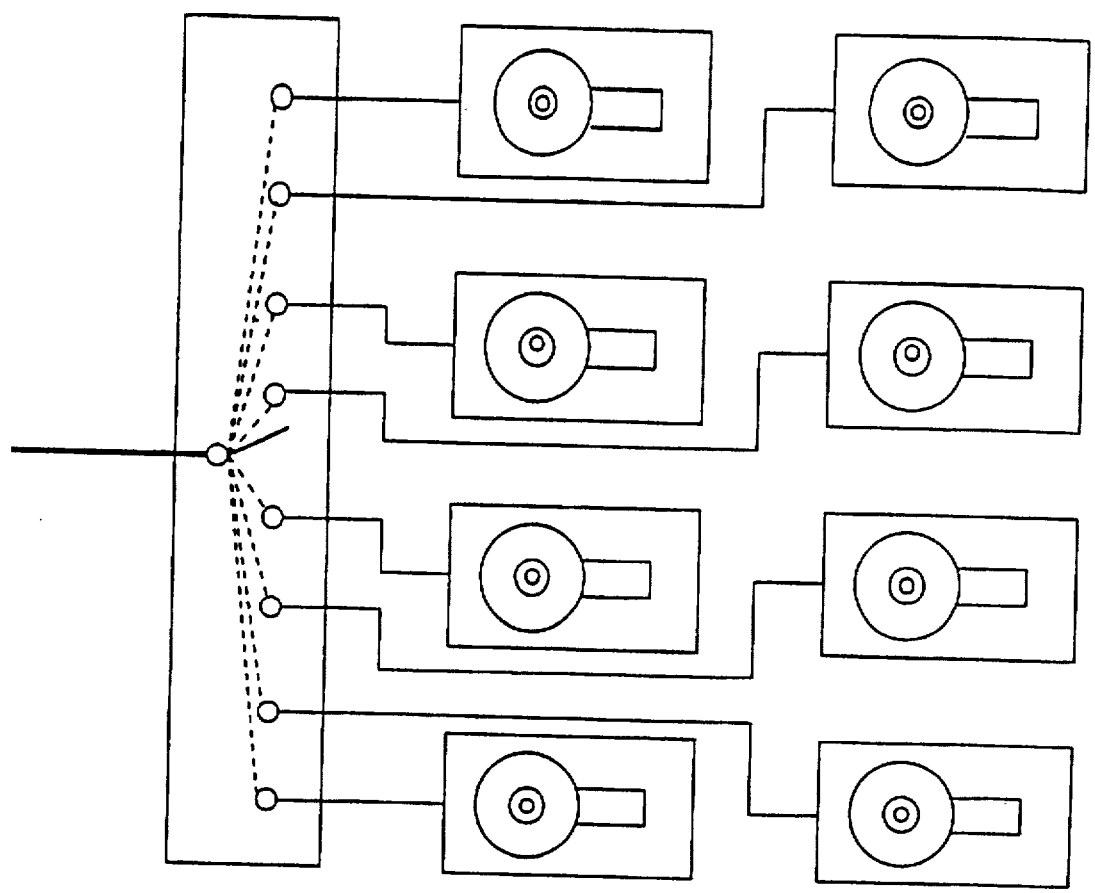
FIG. 7 is a diagram showing the structure of a conventional disc playback system.

FIG. 3 is a flowchart showing the operation steps in the operation mode. In the operation mode, when the user issues a playback request for a disc in the rack from the instructing means 6 such as a playback remote control, the beginning part of data of the selected disc is read from the storage unit 5 (step 31) and is sent immediately to the outputting means 3 (step 32). For example, if the disc contains MPEG moving-image data, the beginning part data is sent to the MPEG decompression chip, the reproduced image signals are displayed on CRT3, and sounds are output to the speaker 3b.

While the beginning part data is being retrieved from the storage unit 5, the changer 4 mounts the selected disc from the rack onto the player 2 (step 33) under control of the CPU 7. Data is read from the disc (step 34) and is stored in the buffer memory 9. Data is stored in this manner, beginning at the part of data immediately following the beginning part data being played back.

The beginning part data, read from the storage unit 5 and sent to the outputting means 3, is synchronized with the beginning part data from the disc (steps 35 and 36) and is switched to it (step 37). More specifically, the source of data to be sent to the outputting means 3 is switched, under control of the CPU 7, to the buffer memory 9 when the end of the beginning part data is reached.

The beginning part data need not necessarily be sent until its end is reached. That is, the source of beginning part data may be switched to the buffer memory 9 in the timing in which the beginning part data from the buffer memory 9 synchronizes with the beginning part data being played back.

This switching may be performed by changing the data flow with the use of a switch or by changing the value of the pointer to the source of read data. This ensures smooth, continuous data switching.

Figure 8:
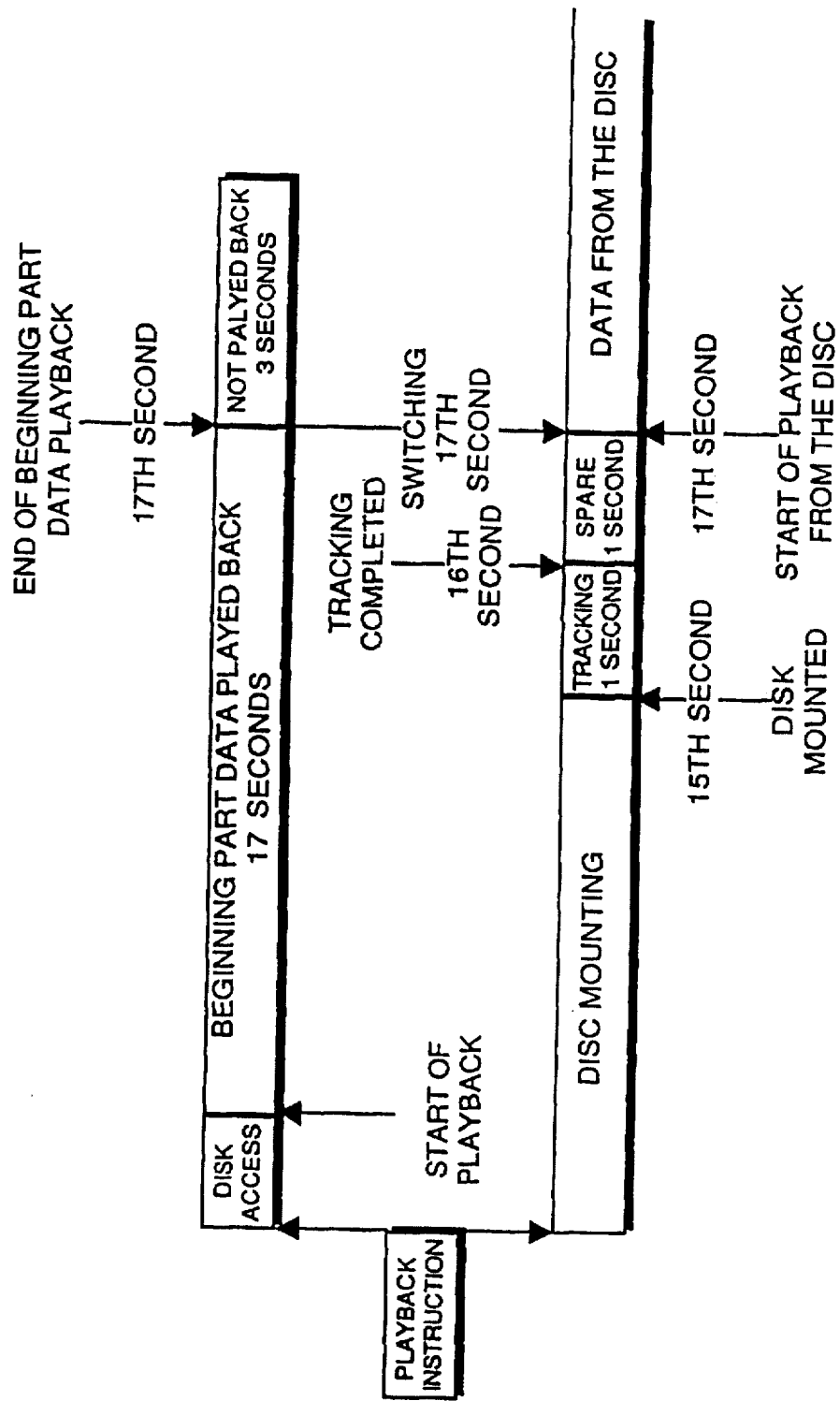
FIG. 8 is a conceptual diagram showing how beginning part data is switched to data from a disc in the embodiment of this invention.

The following shows an example of synchronized switching. FIG. 8 is a conceptual diagram showing how beginning part data is switched to data read from a disc in this embodiment (Scaling is not proportional to the elapsed time). In this figure, assume that there is 20 seconds of beginning part data that is MPEG digital data and that the disc is mounted on the player when 15 seconds of the beginning part data has been played back.

In this case, within one second, the optical read head of the player can track a desired point on the disc, for example, the 17-second position relative to the beginning. When tracking is completed and data is read from the 17-second position on the disc, the playback position of the beginning part data is still at the 16-second position. Data in the 17-second position and in the following positions is written into the buffer memory. And, at the same time the 17-second position of the beginning part data is reached, the source of data is switched to the 17-th position in the buffer memory.

Although data that is read from the disc is one second earlier than the data the user views, there is no problem with this one-second delay. This is because data is read from the buffer memory that has been previously written into.

The buffer may be structured according to data to be stored; for example, when MPEG digital data is used, two 2048-byte buffer areas, each for 1/15 second of data, may be provided for efficient data decoding. In this construction, while data is being read from one area, the next data is written into the other area. At the same time data has been read from the former area, the next data is read from the latter area. And, while data is being read from the latter area, the next data is written into the former area. This sequential switching operation between the read area and the write area is called a toggle operation.

As described above, beginning part data previously read from a disc and stored in the storage unit is used from the time a playback request is made to the time data is read from the disc. There is no wait time because data is read from the storage unit 5 instantly. And, only as many players 2 as are required for concurrent playback are necessary. Therefore, this embodiment makes it possible to provide a low-cost disc playback system which minimizes the time the user has to wait for data to be played back from a disc.

In addition, this embodiment reads data from a disc and stores it in the buffer memory 9, preventing an out-of-track condition or other errors from occurring. The embodiment also synchronizes the end point of the beginning part with the corresponding playback start point on the disc to play back data without interruption.

The advantage of this invention is apparent when it is applied to a karaoke system with the video feature using a BGV and so forth, because it allows video and sound data to be played back immediately after the user makes a playback request. This prevents the user from being left cold because of a long wait time. Of course, this invention may be applied not only to a karaoke system with the video feature but to any other devices to which it is applicable. As shown in FIG. 1, the sound input microphone 11 permits the users voice to be mixed by a sound mixing circuit 12 with the recorded sound.

(3) Other embodiments

This invention is not limited to the above embodiment but may be embodied in other specific forms without departing from the spirit or essential characteristics thereof.

For example, the fixed disk unit 5 used as the storage unit may be a unit with a plurality of sets of heads. Because one set of a plurality of heads, each for a surface, is provided on a standard fixed disk unit, the heads of the set can locate only one cylinder (one particular track on each surface) at a time.

However, a fixed disk unit with a plurality of sets of heads 10 can play back a plurality of data pieces concurrently because each set of heads can play back data from a different cylinder (track on each surface) of the fixed disk. So, even when a plurality of disc playback requests are given, the data read speed of the fixed disk is no longer a bottleneck and data is supplied efficiently.

This invention also enables only beginning part data to be played back when such a request is given. This eliminates the need to mount a disc on the player and allows the user to hear only the beginning part of a disc. This invention may also be applied to a variety of entertainments such as the "guess song-name" game in which participants listen to the beginning part of a song and guess what song it is.

As described above, this invention makes it possible to provide a low-cost disc playback system, karaoke system, and disc playback method which minimize the time the user has to wait for data to be played back from a disc.

While a preferred embodiment has been described, variations thereto will occur to those skilled in the art within the scope of the present inventive concepts which are delineated by the following claims.

What is claimed is:

1. A disc playback system comprising:

a rack for storing a plurality of discs containing data;

a player for reading data from the disc;

outputting means for outputting the data that has been read;

a changer for mounting the disc from the rack onto the player and for returning the disc from the player to the rack;

a storage unit for storing data;

initialization storing means for mounting a disc, added to the rack, onto the player and for reading the beginning part of data from the disc and storing it in the storage unit;

instructing means for giving an instruction to play back a disc in the rack;

a first reading means for reading the beginning part data of the requested disc stored by the initialization storing means in the storage unit and immediately sending it to the outputting means;

a second reading means for mounting the requested disc onto the player, while the beginning part data is being played back, and for starting a reading of data from the mounted disc; and switching means for switching the beginning part data from the storage unit, which has been sent to the outputting means, to the data from the mounted disc corresponding to the beginning part data when synchronization is established;

wherein, the data on the disc contains a sequence of contents data containing at least one of video data or sound data and wherein the storing means stores the beginning part of the sequence of contents data as the beginning part data.

2. A disc playback system as claimed in claim 1, further comprising a buffer memory in which data read from a disc added to the rack is stored.

3. A disc playback system as claimed in claim 1, wherein a fixed disk unit containing a fixed disk is used as the storage unit, the fixed disk unit having a plurality of sets of heads, each set of heads being capable of playing back data from a different track of the fixed disk concurrently.

4. A disc playback system as claimed in claim 1, further comprising beginning part playback means for playing back only the beginning part data upon request.

5. A karaoke system comprising:

a rack for storing a plurality of discs containing data;

a player for reading data from the disc;

outputting means for outputting the data that has been read;

a changer for mounting the disc from the rack onto the player and for returning the disc from the player to the rack;

a storage unit for storing data;

initialization storing means for mounting a disc, added to the rack, onto the player and for reading the beginning part of data from the disc and storing it in the storage unit;

instructing means for giving an instruction to play back a disc in the rack;

a first reading means for reading the beginning part data of the requested disc prestored in the storage unit and immediately sending it to the outputting means;

a second reading means for mounting the requested disc onto the player, while the beginning part data is being played back, and for starting a reading of data from the mounted disc;

switching means for switching the beginning part data from the storage unit, which has been sent to the outputting means, to the data from the mounted disc corresponding to the beginning part data when synchronization is established;

a sound input microphone; and a sound mixing circuit;

wherein, the data on the disc contains a sequence of contents data containing at least one of video data or sound data and wherein the storing means stores the beginning part of the sequence of contents data as the beginning part data.

6. A disc playback method using:

a rack for storing a plurality of discs containing data; a player for reading data from the disc; outputting means for outputting the data that has been read; a changer for mounting the disc from the rack onto the player and for returning the disc from the player to the rack; and a storage unit for storing data;

said method comprising:

a storing process for mounting the disc, added to the rack, onto the player and for reading the beginning part data from the disc and storing it in the storage unit;

an instructing process for giving an instruction to play back the disc in the rack;

a first reading process for reading the beginning part data of the requested disc from the storage unit and immediately sending it to the outputting means;

a second reading process for mounting the requested disc onto the player, while the beginning part data is being played back, and for starting the reading of data from the disc; and a switching process for switching the beginning part data from the storage unit, which has been sent to the outputting means, to the data from the disc corresponding to the beginning part data when synchronization is established;

wherein, the data on the disc contains a sequence of contents data containing at least one of video data or sound data and wherein the storing means stores the beginning part of the sequence of contents data as the beginning part data.

7. A karaoke system for providing video and audio from storage media, comprising:

a storage device for storing the storage media;

a player unit for reading video and audio information from the storage media to provide output signals;

means for mounting a storage medium from the storage device on the player unit;

means for responding to the player unit output signals to provide video and audio to a user;

means for selecting a storage medium for play;

means for causing the means for mounting to mount a storage medium on the player unit and storing a predetermined amount of output signals which are of a time period greater than a time period necessary to retrieve a storage medium from the storage device by the means for mounting and mounting it on the player unit; and means for synchronizing the playing of the stored predetermined amount of output signals with the actual playing of a storage medim so that the user will not be subject to a delay when selecting a storage medium for play.

* * * * *